United States Patent
Hummel

(10) Patent No.: US 10,269,045 B2
(45) Date of Patent: Apr. 23, 2019

(54) CHOOSING ALLOCATIONS AND PRICES IN POSITION AUCTIONS

(71) Applicant: Google LLC, Mountain View, CA (US)

(72) Inventor: Patrick Hummel, Cupertino, CA (US)

(73) Assignee: Google LLC, Mountain View, CA (US)

( * ) Notice: Subject to any disclaimer, the term of this patent is extended or adjusted under 35 U.S.C. 154(b) by 1022 days.

(21) Appl. No.: 14/312,425

(22) Filed: Jun. 23, 2014

(65) Prior Publication Data

US 2015/0371285 A1 Dec. 24, 2015

(51) Int. Cl.
*G06Q 30/02* (2012.01)

(52) U.S. Cl.
CPC ..... *G06Q 30/0275* (2013.01); *G06Q 30/0243* (2013.01)

(58) Field of Classification Search
CPC ........... G06Q 30/0275; G06Q 30/0277; G06Q 30/0241; G06Q 30/0251; G06Q 30/0273; G06Q 30/02
See application file for complete search history.

(56) References Cited

U.S. PATENT DOCUMENTS

| | | | |
|---|---|---|---|
| 2004/0267612 A1* | 12/2004 | Veach .................... | G06Q 30/02 705/14.52 |
| 2010/0198694 A1* | 8/2010 | Muthukrishnan .. | G06Q 30/0275 705/14.71 |
| 2013/0325585 A1* | 12/2013 | Amit .................. | G06Q 30/0241 705/14.41 |

OTHER PUBLICATIONS

Chatwin, Richard, "An Overview of Computational Challenges in Online Advertising," 2013 American Control Conference (ACC), Jun. 17-19, all pages. (Year: 2013).*
Agarwal et al., 'Location, Location, Location: An Analysis of Profitability of Position in Online Advertising Markets,' Journal of Marketing Research, 2011 [online][Retrieved on Jun. 23, 2014]; Retrieved from the Internet URL: http://papers.ssrn.com/sol3/papers.cfm?abstract_id=1151537, 48 pages.
U.S. Appl. No. 13/861,062, filed Apr. 11, 2013, Dynamic Reallocation of Content Item Blocks, Hummel et al.
PCT/US2014/033645, Apr. 10, 2014, Dynamic Reallocation of Content Item Blocks, Hummel et al.

* cited by examiner

*Primary Examiner* — Jacob C. Coppola
(74) *Attorney, Agent, or Firm* — Fish & Richardson P.C.

(57) ABSTRACT

The subject matter of this specification can be embodied in, among other things, a method that includes receiving a request for content to fill a block, the request including information about a size of the block and criteria for identifying eligible content items for inclusion in the block, determining a number of content items to be included in the block, including determining amounts of dynamic resizing to apply to content items, determining an estimate of a difference in conversion rates conditional on receiving an interaction in the different configurations that perform differing amounts of dynamic resizing, and applying the estimate when determining an efficiency for a number of permutations of allocations of eligible content items, establishing a price to be charged to each content sponsor associated with a permutation that has a highest efficiency, and providing the eligible content items and charging the content sponsors based on the established prices.

20 Claims, 4 Drawing Sheets

CHOOSING ALLOCATIONS AND PRICES IN POSITION AUCTIONS

TECHNICAL FIELD

This specification relates to information presentation.

BACKGROUND

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can then be provided to the user on any devices associated with the user such as a personal computer (PC), a smartphone, a laptop computer, a tablet computer, or some other user device.

SUMMARY

In general, this document describes systems, methods and computer program products for choosing allocations and prices in position auctions when dynamic resizing of sponsored content influences conversion rates.

In a first aspect, a computer-implemented method includes receiving a request for content to fill a block, the request including information about a size of the block and selection criteria for identifying one or more eligible content items for inclusion in the block, determining a variable number of content items to be included in the block wherein determining the variable number further includes determining differing amounts of dynamic resizing to apply to content items to be included in the block in each of a plurality of different configurations, determining an estimate of a difference in conversion rates conditional on receiving an interaction in the different configurations that perform differing amounts of dynamic resizing, and applying the estimate when determining an efficiency for each of a number of permutations of allocations of eligible content items, establishing a price to be charged to each content sponsor associated with a permutation that has a highest efficiency based on the determining, and providing the eligible content items associated with the determined permutation responsive to the request and charging the content sponsors based on the established prices.

Various implementations can include some, all, or none of the following features. The efficiency can be a product of a scaling factor and a summation of individual values associated with content sponsors that are proposed to be included in the block for a given permutation taking into account both an increased number of interactions that will occur when a content item is resized, and a given individual value can be based on a combination of a bid price and a quality score associated with a respective individual eligible content item when included in the block. The scaling factor can be a function of the estimated conversion rate. Establishing can include, for each position in a determined highest efficiency permutation, determining a total increase of efficiency associated with all other content sponsors when removing a content sponsor associated with a given position, the total increase of efficiency being based on content items excluding the content item associated with the excluded content sponsor, and establishing a price for each position based on the determined increase in efficiency. Determining a total increase in efficiency can also include determining an efficiency of the determined permutation without a respective content sponsor that is associated with a given position, determining a total counterfactual efficiency equal to the highest efficiency permutation that removes a respective eligible content item from the block, and combining the determined efficiency and the determined total counterfactual efficiency. Combining can include subtracting the determined efficiency from the determined total counterfactual efficiency. Determining an efficiency of the determined permutation can include removing a contribution in an efficiency calculation for a respective eligible content item that is associated with a given position of the block. The eligible content items can be advertisements. The method can also include dynamically re-sizing the eligible content items that are associated with the determined highest efficiency permutation based at least in part on a value to a respective sponsor for inclusion of their content item in the block. The method can also include determining a reserve price that is associated with the block for any content items that are to be included in the block and using the reserve price in establishing the price. Establishing the price can include using the reserve price as a floor when calculating efficiency for the highest efficiency permutation. Using the reserve price as a floor can include using the reserve price instead of a bid price when the bid price is less than the reserve price for a given eligible content item. Establishing a price can further include dividing the highest efficiency by a quality score associated with a respective eligible content item that is proposed to be presented in a given position. The quality score can include a measure of predicted performance for a given eligible content item when presented in a position included in the block.

In a second aspect, a system includes one or more computing devices and one or more computer-readable media coupled to the one or more computing devices and having instructions stored thereon which, when executed by the one or more computing devices, cause the one or more computing devices to perform operations comprising receiving a request for content to fill a block, the request including information about a size of the block and selection criteria for identifying one or more eligible content items for inclusion in the block, determining a variable number of content items to be included in the block wherein determining the variable number further includes determining differing amounts of dynamic resizing to apply to content items to be included in the block in each of a plurality of different configurations, determining an estimate of a difference in conversion rates conditional on receiving an interaction in the different configurations that perform differing amounts of dynamic resizing, and applying the estimate when determining an efficiency for each of a number of permutations of allocations of eligible content items, establishing a price to be charged to each content sponsor associated with a permutation that has a highest efficiency based on the determining, and providing the eligible content items associated with the determined permutation responsive to the request and charging the content sponsors based on the established prices.

Various implementations include some, all, or none of the following features. The efficiency can be a product of a scaling factor and a summation of individual values associated with content sponsors that are proposed to be included in the block for a given permutation taking into account both an increased number of interactions that will occur when a content item is resized, and a given individual value can be based on a combination of a bid price and a quality score associated with a respective individual eligible content item when included in the block. Establishing can include, for each position in a determined highest efficiency permutation, determining a total increase of efficiency associated with all other content sponsors when removing a content sponsor associated with a given position, the total increase of efficiency being based on content items excluding the content item associated with the excluded content sponsor, determining a highest efficiency from among the total efficiencies determined, and establishing a price for each position based on the determined increase in efficiency. Determining a total increase in efficiency can also include determining an efficiency of the determined permutation without a respective content sponsor that is associated with a given position, determining a total counterfactual efficiency equal to the highest efficiency permutation that removes a respective eligible content item from the block, and combining the determined efficiency and the determined total counterfactual efficiency.

In a third aspect, a computer storage medium is encoded with a computer program, the program comprising instructions that when executed by data processing apparatus cause the data processing apparatus to perform operations comprising receiving a request for content to fill a block, the request including information about a size of the block and selection criteria for identifying one or more eligible content items for inclusion in the block, determining a variable number of content items to be included in the block wherein determining the variable number further includes determining differing amounts of dynamic resizing to apply to content items to be included in the block in each of a plurality of different configurations, determining an estimate of a difference in conversion rates conditional on receiving an interaction in the different configurations that perform differing amounts of dynamic resizing, and applying the estimate when determining an efficiency for each of a number of permutations of allocations of eligible content items, establishing a price to be charged to each content sponsor associated with a permutation that has a highest efficiency based on the determining, and providing the eligible content items associated with the determined permutation responsive to the request and charging the content sponsors based on the established prices.

Various implementations include some, all, or none of the following features. The efficiency can be a product of a scaling factor and a summation of individual values associated with content sponsors that are proposed to be included in the block for a given permutation taking into account both an increased number of interactions that will occur when a content item is resized, and a given individual value can be based on a combination of a bid price and a quality score associated with a respective individual eligible content item when included in the block. Establishing can include, for each position in a determined highest efficiency permutation, determining a total increase of efficiency associated with all other content sponsors when removing a content sponsor associated with a given position, the total increase of efficiency being based on content items excluding the content item associated with the excluded content sponsor, determining a highest efficiency from among the total efficiencies determined, and establishing a price for each position based on the determined increase in efficiency.

The systems and techniques described here may provide none, one or more of the following advantages. Use of the proposed allocation methods can increase advertiser welfare by doing a better job of choosing configurations of sponsored content where advertisers are relatively more likely to receive a conversion conditional on receiving a click. Use of the proposed allocation methods can increase publisher welfare by giving advertisers an incentive to bid more per click since the clicks they receive will be relatively more valuable to them. Use of the proposed allocation methods can increase aggregate social welfare by giving advertisers an incentive to place a bid that equals their true value per click for a typical advertising opportunity and thereby ensures that the system can show the advertisements from the advertisers who truly have the highest value for the advertising opportunities.

The details of one or more implementations are set forth in the accompanying drawings and the description below. Other features and advantages will be apparent from the description and drawings, and from the claims.

DETAILED DESCRIPTION

This document describes systems, methods and computer program products for choosing allocations and prices in position auctions in which dynamic resizing influences conversion rates. In general, a web page can include a space in which sponsored content (e.g., advertisements) can be displayed. One large content item can be shown (filing the entire space of the block), or the space can be subdivided to display two or more relatively smaller content items. Larger content items may generally have higher click-through rates (CTRs) than relatively smaller content items, but higher CTRs are not always proportional to generate higher conversion rates (CRs). For example, a larger content item may simply be easier to interact with (e.g., click on) and therefore have a higher CTR than a smaller content item, but that does not necessarily mean that the user is any more likely to purchase the product or services being featured. Conversely, a user may need to exercise greater purposeful effort to interact with (e.g., click on) a relatively smaller content item, and may therefore be more likely to follow through with a purchase of the product or service being featured. As will be described in more detail below, the systems, methods and computer program products described herein can be used in association with selective content sizing and values based on predicted conversion rates.

Figure 1:
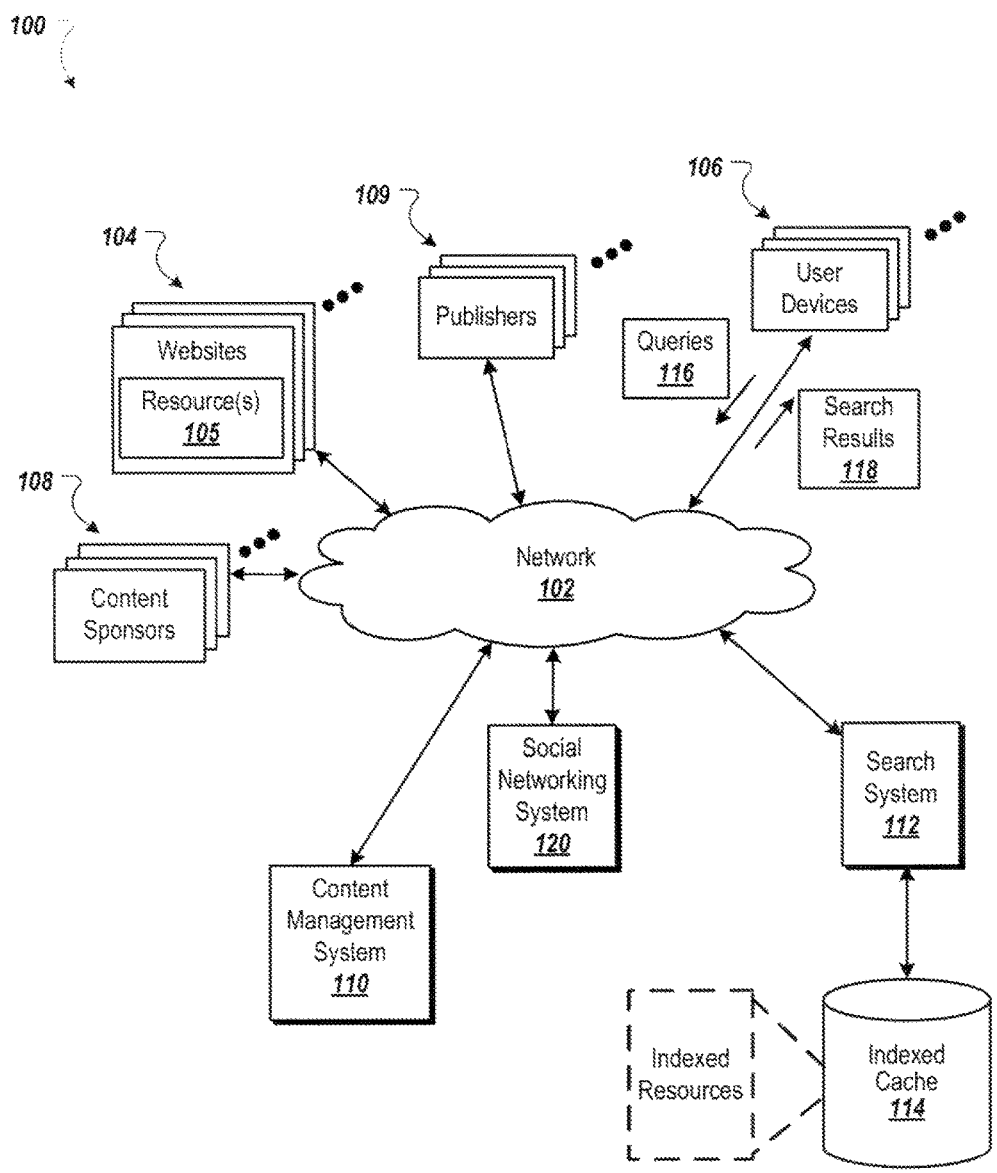
FIG. 1 is a block diagram of an example environment for delivering content.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, the content management system 110 and, in this example, a social networking system 120. The example environment 100 may include many thousands of websites 104, user devices 106, content sponsors 108 and publishers 109.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a block (e.g., portion) of the resource or a block of a user display, such as a presentation location of a pop-up window or a slot of a third-party content site or webpage, in which content (e.g., sponsored content) can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a webpage title, a snippet of text or a portion of an image extracted from the webpage, and the URL of the webpage. Search results pages can also include one or more slots in which other content items (e.g., ads) can be presented.

In some implementations, slots on search results pages or other webpages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. As will be described in additional detail below, multiple slots may be designated within a block to display multiple content items, or the space for two or more slots may be combined to create a larger area in which a content item may be displayed. The request for content can include characteristics of the various combinations of slot sizes that are available for the requested resource or search results page, and can be provided to the content management system 110.

For example, a reference (e.g., URL) to the resource for which slots are defined, the size of the available slots, and/or the media types that are available for presentation in the slots can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals.

The content management system 110 can select from the eligible content items that are to be provided for presentation in slots of a resource or search results page based at least in part on an estimated difference in conversion rates among multiple different configurations of dynamically resizable slots. For example, for the eligible content items, the content management system 110 can compare a difference in value between a first configuration that includes two small ad slots and a second configuration that includes only one large ad slot that fills the space of the two small ad slots, and allocate the slots based at least in part on the estimated difference in value (e.g., based on the highest conversion rate or based on other criteria). The estimates can represent the ratio of users who interact (e.g., click through) an ad compared to the subpopulation of users who also "convert" (e.g., actually purchase the advertised item, or otherwise follow through with an action desired by the advertiser). In some implementations, the estimates can be used in a selection of allocations of sponsored content given the particular estimates for the differences in conversion rates. Prices that the content sponsors may be willing to pay for presentation (or selection or other interaction with) of their content with a resource or search results page are then estimated based on the selected allocation of sponsored content and the estimates for the differences in conversion rates.

For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors. How the number of content items to include in a block and the sizing/re-sizing of selected items is discussed in greater detail below. The proposed process explicitly accounts for differences in conversion rates when various amounts of dynamic resizing of content items is implemented, in order to set appropriate allocations and prices for the presentation of content items.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as republishing or sharing the content item. Other actions that constitute a conversion can also be used.

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be anonymized in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

In some implementations, content items (e.g., advertisements) can be selected by the content management system 110 using various techniques for dynamically allocating content items to blocks, as will be described in greater detail below. For example, in response to a request to fill a content item block, the content management system 110 can select one or more content items, e.g., that best satisfy the request. In some implementations, the selection process can include the use of mathematical and other techniques to determine efficiencies associated with different permutations of content items that are eligible to fill one or more slots. The selection of one or more content items from among eligible content items can be based on estimated difference in conversion rates among various, differently sized content items.

Figure 2A:
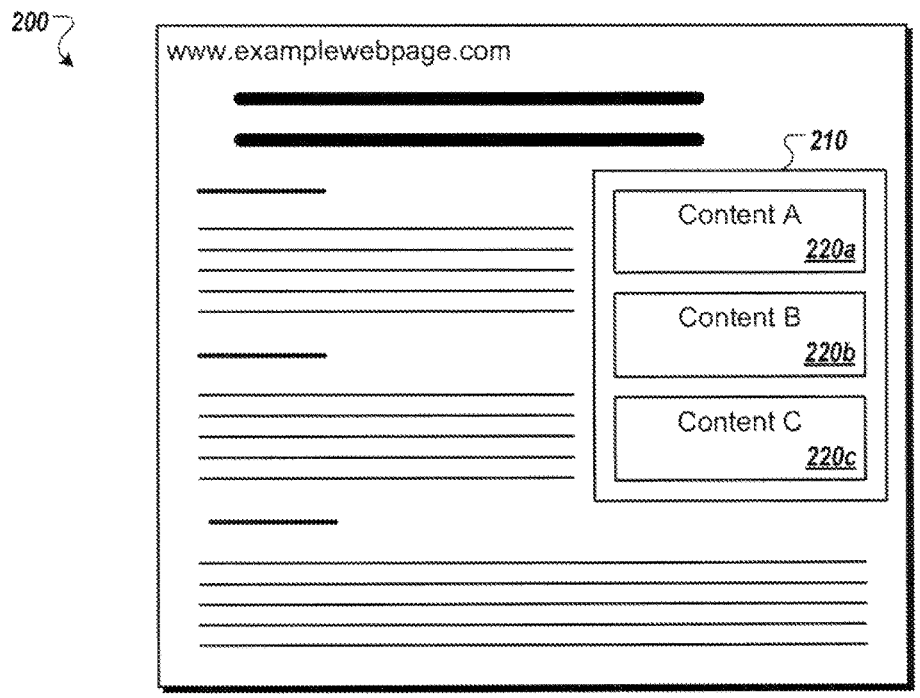
FIGS. 2A and 2B are examples of a web page that includes a block defining a region provided for the display of one or more content items.
Figure 2B:
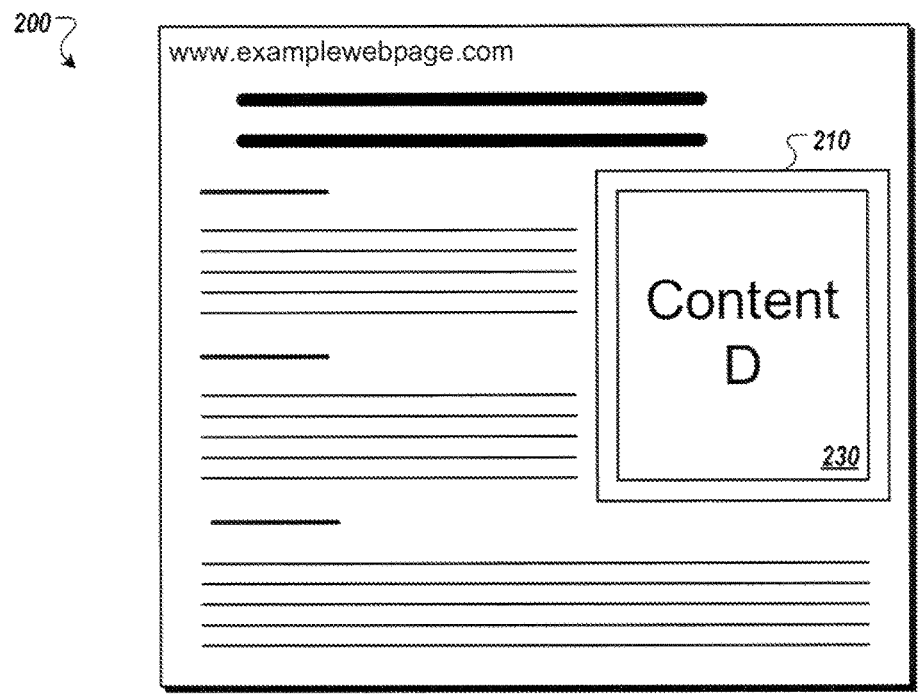

FIGS. 2A and 2B are examples of a web page 200 that includes a block 210 defining a region provided for the display of one or more content items. In some implementations, the web page 200 can be the resource 105 of FIG. 1. In the illustrated example the web page 200 is shown as an HTML page as presented by a web browser, although in some implementations the web page 200 can be any appropriate resource such as a word processing document, a PDF document, an image, a video, a news feed source, or any data that can be provided over a network, such as the network 102.

The web page 200 includes the block 210. The block 210 is a region within the web page 200 as presented for display to a user. The block 210 defines a region provided for the display of one or more content items, such as sponsored content (e.g., advertisements, promotional media).

The block 210 includes a collection of content slots 220a-220c. Each of the content slots 220a-220c defines a sub-region of the block 210 provided for the display of a content item. In the illustrated example, the block 210 includes three content slots, and each of the content slots 220a-220c can display a content item such as an advertisement or other sponsored content. As such, in the illustrated example, the block 210 displays three content items.

In some implementations, the quantity and sizes of the content slots 220a-220c is dynamic. The block 210 can provide a relatively greater number of content slots having relatively smaller displayed sizes, or the block 210 can provide a relatively fewer number of content slots having relatively greater displayed sizes. In some implementations, the number and sizing of the slots can be dynamic (e.g., in accordance with an efficiency evaluation as discussed in greater detail below).

Referring now to FIG. 2B, the block 210 is shown with a single content slot 230. The content slot 230 defines substantially the entire region of the block 210. In the illustrated example, the block 210 includes one content slot, and the content slot 230 can display a content item such as an advertisement or other sponsored content. As such, in the illustrated example of FIG. 2B, the block 210 displays one content item.

Auction mechanisms used by the content management system 110 of FIG. 1 can be configured to incentivize the content sponsors 108 to make bids close to the true value for an interaction (e.g., a click) such as when the content sponsors 108 have some fixed value for an interaction. However, the value for an interaction may not be fixed in practice. For example, the value of a click for some content items is at least partly derived from the possibility that a click will ultimately lead to a conversion, such as a user purchasing one of the content sponsor's 108 products. The likelihood that a user's click will lead to a conversion can depend greatly on the allocation of sponsored content that is selected for presentation to the user. In particular, if one of the content sponsors' content items is shown in a content slot that has dynamically resized the sponsored content in such a way as to make the content more prominent, the content sponsor 108 is more likely to receive a click, but such a click may be less likely to lead to a conversion because the click may be relatively less intentional. For example, a bigger ad shown in the content slot 230 may present a bigger target that may be clicked casually or unintentionally by a user who has little intention of purchasing the advertised item or otherwise causing a conversion to happen.

This implies that a click may be more valuable if the click is received in an allocation of sponsored content where dynamic resizing was not performed than if the click was received in an allocation in which dynamic resizing was performed. For example, a user may have to put more deliberate effort into clicking on an advertisement displayed in one of the content slots 220a-220c than into clicking on a larger ad shown in the larger content slot 230. In another example, since each of the content slots 220a-220c are approximately one-third the size of the content slot 230, an accidental click within the block 210 is one-third as likely to land within, e.g., the content slot 220a as it is to land within the content slot 230.

In some implementations, the fact that the content sponsor's 108 value for an interaction can depend on whether dynamic resizing was performed can disincentivize the content sponsors 108 to bid their true value. For example, since clicks that are received when dynamic resizing is performed may be worth less to the content sponsors 108 than clicks that are received when dynamic resizing is not performed, the content sponsors may have an incentive to bid in such a way that the content management system 110 is less likely to perform dynamic resizing. In some examples, as a result the content sponsors 108 may be incentivized to bid considerably less than their average value per click. Not only may the content sponsors 108 have an incentive to bid less than their value per click if dynamic resizing is performed, but the content sponsors 108 may also have an incentive to bid less than the amount they would value a click if dynamic resizing were not performed. These reductions in the content sponsors' 108 bids can potentially hurt both the publishers' 109 revenue and aggregate economic welfare.

The disincentivizing effects of dynamic resizing of content items can be offset by displaying relatively fewer low-conversion configurations of dynamically resized content items, and by reducing the incentives for the content sponsors 108 to bid less than the minimum amount they would ever value a click. In some implementations, by choosing allocations and prices in position auctions, revenues for the publishers 109 may be increased by incentivizing the content sponsors 108 to place higher bids.

Figure 3:
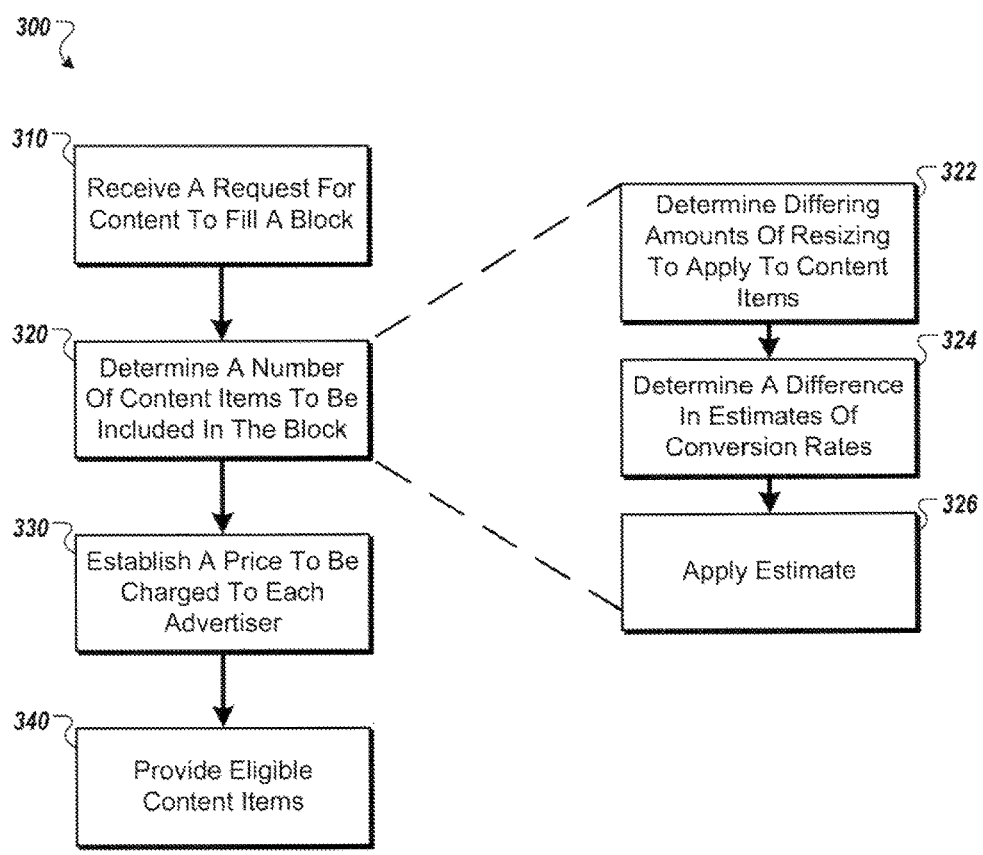
FIG. 3 is a flow diagram for a process for choosing allocations and prices in position auctions.

FIG. 3 is a flow diagram for a process 300 for choosing allocations and prices in position auctions. In some implementations, the process 300 may be performed by the content management system 110 of FIG. 1.

At 310, a request for content to fill a block is received. The request includes information about a size of the block and selection criteria for identifying one or more eligible content items for inclusion in the block. In some implementations, the eligible content items can be advertisements or other forms of sponsored content. For example, the web page 200 may be requested by a user, and one or more of the content slots 220a-220c and/or 230 may be requested for inclusion in the block 210. One or more selections of the sponsored content 110 may be identified for display in the content slots 220a-220c and/or 230.

At 320, a variable number of content items to be included in the block is determined. The determination includes, at 322, determining differing amounts of dynamic resizing to apply to content items to be included in the block in each of a plurality of different configurations, at 324 an estimate of a difference in conversion rates conditional on receiving an interaction (e.g., a click) in the different configurations that perform differing amounts of dynamic resizing is determined, and at 326 the estimate is applied when determining an efficiency for each of a number of permutations of allocations of eligible content items. For example, a model can be created to estimate the relative conversion rates that the content sponsors 108 would get with or without dynamic resizing (and how much resizing) of their respective content items.

For example, at 322, to estimate the difference in the content sponsor 108 conversion rates, a machine learning system may be used to train a model that predicts content sponsor 108 conversion rates conditional on receiving an interaction subsequent to presentation of a given content item. In some implementations, the training may be based in part on log data (e.g., impressions, clicks, conversions) to determine the relative differences in conversion rates among various sizes of dynamically resized content items. Such models may include any appropriate features that could influence the probability that an interacted with (e.g., clicked) impression will receive a conversion, such as whether the sponsored content is a remarketing ad, the particular publisher the ad appears on, and/or how well the user's demographic information matches the content sponsor's desired targeting criterion. The model can also include a feature that equals "1" if exactly "K" ads were displayed and the maximum number of ads that could have been shown was "s" and "0" otherwise for each possible pair of values (k,s) that occurs in the data.

The model that is fitted can be a standard logistic model of the form:

$$p = \frac{1}{1 + e^{-\sum_{i=1}^{n} \beta_i x_i}}$$

The value p denotes the estimated probability that a content item received a conversion, $x_i$ denotes the value of the $i^{th}$ feature in the model, and i denotes the coefficient on this feature. After using a machine learning system to estimate the appropriate values of the coefficients in this model, the coefficient $\beta_{k,s}$ on the feature that corresponds to the variable indicating whether exactly k content items were present when the maximum number of content items that could have been shown was s. An estimate of the relative probability that a content item will receive a conversion if exactly k items are displayed and the maximum number of items that could be shown is s is represented by equation:

$$c_{k,s} = \frac{1}{1 + C_s e^{-\beta_{k,s} + \beta_{s,s}}}$$

where $C_s$ is a constant chosen so that $(1/1+C_s)$ will be equal to the average conversion rate when the maximum number of ads that could be displayed is s and the maximal number of ads is displayed.

For example, at 324 as part of determining an estimate of a difference in conversion rates conditional on receiving an interaction in the different configurations that perform differing amounts of dynamic resizing, several operations may be performed. For example, for each bidder i, $v_i$ can denote a content sponsor $i$'s effective cost per mille (eCPM) bid in this particular auction, meaning $v_i \equiv b_i q_i$ when $b_i$ denotes content sponsor $i$'s cost per click (CPC) bid and $q_i$ denotes this content sponsor's quality score. The value of $v_{(j)}$ denotes the $j^{th}$-highest eCPM bid made by the content sponsors 108. The value of $c_k$ denotes the conversion rates of the content items conditional on receiving a click when exactly k content items are displayed.

The value s denotes the maximum number of content items that can be displayed in the space available within a block (e.g., the block 210), then the system should choose to display a total of k content items, where k is the positive integer in [1,s] that maximizes the efficiency determined as:

$$c_k \Sigma_{j=1}^{k} x_{j,k} v_{(j)}$$

where $x_{j,k}$ denotes the position effect for a content sponsor if k ads are shown and the content sponsor's sponsored content is shown in the $j^{th}$ position. Using this equation, the system will show the content item with the highest eCPM bid in the first position, the content item with the second-highest eCPM bid in the second position, and in general will show the content item with the $j^{th}$-highest eCPM bid in the $j^{th}$ position.

In some implementations, conversion rates, with and without resizing, can be general. For example predicted conversion rates can be determined for a population of content sponsors, advertising campaigns, types of publishers, and/or can depend on the amount of resizing and/or number of content items being presented in the block 210. In some implementations, conversion rates, with and without resizing, can be specific to content sponsors, advertising campaigns, and/or types of publishers.

For example at 326, to set the price that the content sponsor 108 in the $j^{th}$ position is to pay per click when exactly k content items are displayed, let $$S_{j,s} = \max_{k \in [1,s]} c_k \Sigma_{i=1}^{j-1} x_{i,k} v_{(i)} + \Sigma_{i=j}^{k} x_{i,k} v_{(i+1)})$$

and let $$R_{j,k} \equiv c_k \Sigma_{i \neq j} x_{i,k} v_{(i)}.$$

In some implementations, the content sponsor 108 in the $j^{th}$ position should be charged a total price per click (PPC) of:

$$\text{Total } PPC = \frac{1}{c_k q_{(j)} x_{j,k}} (S_{j,s} - R_{j,k})$$

where $q_{(j)}$ denotes the quality score of the content sponsor 108 in the $j^{th}$ position. In some implementations, such pricing may give the content sponsors 108 an incentive to make a bid per interaction that is substantially equal to their true value.

In some implementations, determining an efficiency of the determined permutation can include removing a contribution in an efficiency calculation for a respective eligible content item that is associated with a given position of the block. In some implementations, establishing a price to be charged to each content sponsor can include, for each position in a determined highest efficiency permutation, determining a total increase of efficiency associated with all other content sponsors when removing a content sponsor associated with a given position, the total increase of efficiency being based on content items excluding the content item associated with the excluded content sponsor, and establishing a price for each position based on the determined increase in efficiency. For example, the total PPC can be determined in part by comparing the estimated PPCs for a collection of content items with a selected content item included in the collection, and the estimated PPCs for the collection with the selected content item excluded from the collection. In some implementations, establishing a price to be charged to each content sponsor can include, for each position in a determined highest efficiency permutation, determining a highest efficiency from among the total efficiencies determined.

In some implementations, determining a total increase in efficiency can also include determining an efficiency of the determined permutation without a respective content sponsor that is associated with a given position, determining a counterfactual efficiency (e.g., the highest efficiency that could be achieved if some particular advertiser were not in the auction) equal to the highest efficiency permutation that removes a respective eligible content item from the block, and combining the determined efficiency and the determined total counterfactual efficiency. For example, in an auction for a single advertising position, the counterfactual efficiency if the winning advertiser were not in the auction would be the efficiency resulting from displaying the runner-up. In some implementations, combining includes subtracting the determined efficiency from the total determined counterfactual efficiency.

At 330, a price is established. In some implementations, the price is the amount to be charged to each content sponsor associated with a permutation that has a highest efficiency based on the determining. In some implementations, the efficiency can be a product of a scaling factor and a summation of individual values associated with content sponsors that are proposed to be included in the block for a given permutation taking into account both an increased number of interactions that will occur when a content item is resized, and wherein a given individual value is based on a combination of a bid price and a quality score associated with a respective individual eligible content item when included in the block. For example, the price can be the total PPC applied in step 326.

In some implementations, establishing a price can also include dividing the highest efficiency by a quality score associated with a respective eligible content item that is proposed to be presented in a given position. In some implementations, the quality score can include a measure of predicted performance for a given eligible content item when presented in a position included in the block. For example, the CTR or conversion rate for a content item in the content slot 220a may be higher than the CTR or conversion rate for the same content item when presented in the content slot 220b. Such differences can be accounted for in the determination of the estimated price.

At 340, the eligible content items are provided. The eligible content items are associated with the determined permutation responsive to the request and charging the content sponsors based on the established prices.

In some implementations, the process 300 can also include dynamically resizing the eligible content items that are associated with the determined highest efficiency permutation based at least in part on a value to a respective sponsor for inclusion of their content item in the block. For example, the determination of whether a content item should be displayed within the space provided by one of the content slots 220a-220c or the relatively larger space provided by the content slot 230 can be based in part on the difference in the value of dynamically resizing and presenting the content item in one of the different size formats provided by the content slots 220a-220c and 230.

In some implementations, the process 300 can also include determining a reserve price that is associated with the block for any content items that are to be included in the block and using the reserve price in establishing the price. In some implementations, establishing the price can include using the reserve price as a floor when calculating efficiency for the highest efficiency permutation. For example, a reserve price may be associated with the block 210, and the reserve price may be used as the minimum price for any sponsored content or combination of content that may be displayed in the block 210. In some implementations, using the reserve price as a floor can include using the reserve price instead of a bid price when the bid price is less than the reserve price for a given eligible content item when calculating efficiency for the highest efficiency permutation.

Figure 4:
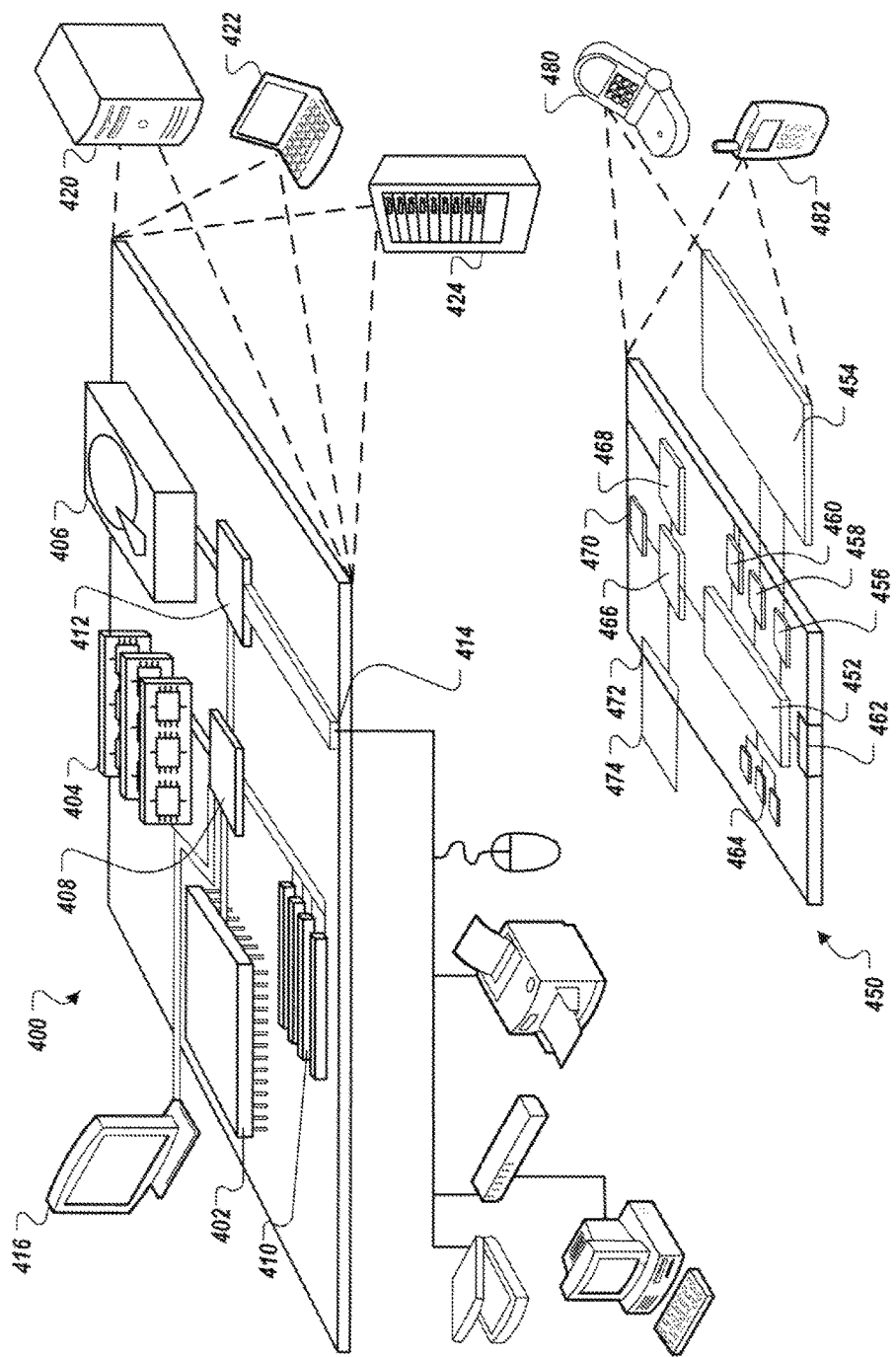
FIG. 4 is a block diagram of computing devices that may be used to implement the systems and methods described in this document

FIG. 4 is a block diagram of computing devices 400, 450 that may be used to implement the systems and methods described in this document, either as a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, Voice Over LTE (VOLTE) calls, SMS, EMS, or MMS messaging, CDMA, TDMA, PDC, WCDMA, CDMA2000, GPRS, WiMAX, LTE, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communication audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving a request for content to fill a block, the request including information about a size of the block and selection criteria for identifying one or more eligible content items for inclusion in the block;

determining estimated conversion rates of content items presented in different content item configurations, each with different amounts of dynamic content item resizing applied to one or more of the content items in the different content item configurations, wherein a content item conversion is a specified user action that is completed at a website to which a user is directed after and in response to the user interacting with the content item;

determining an efficiency for each of the different content item configurations with the different amounts of dynamic content item resizing applied, wherein the efficiency for a given content item configuration with k content items included in the block is determined as:

$$c_k \Sigma_{j=1}^{k} x_{j,k} v_{(j)},$$

where $c_k$ is an estimated conversion rate of content items presented in the given content item configuration when k content items are presented in the given content item configuration, $x_{j,k}$ is a position effect for a content item shown in a j-th position in the given content item configuration when k content items are presented in the given content item configuration, and $v_{(j)}$ is a j-th highest effective bid from a set of multiple effective bids from content item sponsors for inclusion of their respective content items in the block;

determining how many content items to be included in the block, including:
  identifying a content item configuration having a highest efficiency; and
  determining a number of content items that are included in the identified content item configuration having the highest efficiency;

selecting the number of eligible content items for presentation in the identified content item configuration;

dynamically re-sizing eligible content items selected for presentation in the identified content item configuration according to the dynamic content item resizing that was applied when the efficiency for the identified content item configuration was determined;

establishing a price to be charged to each content item sponsor having an eligible content item that was selected for presentation in the identified content item configuration; and providing the selected eligible content items for presentation in the identified content item configuration responsive to the request and charging the content item sponsors based on the established prices.

2. The method of claim 1 wherein an effective bid is based on a combination of a bid price and a quality score for a respective individual eligible content item when included in the block.

3. The method of claim 1 wherein establishing includes, for each position in the identified content item configuration:
  determining a total increase in efficiency for all other content items when removing a content item selected for presentation in a given position, wherein the total increase in efficiency is based on all content items except the removed content item; and
  establishing a price for each position based on the determined increase in efficiency.

4. The method of claim 3 wherein determining a total increase in efficiency further includes:
  determining an efficiency for the identified content item configuration without a respective content item that is selected for presentation in a given position;
  determining a total counterfactual efficiency equal to the highest efficiency content item configuration that does not include a respective eligible content item in the block; and
  combining the determined efficiency and the determined total counterfactual efficiency.

5. The method of claim 4 wherein combining includes subtracting the determined efficiency from the determined total counterfactual efficiency.

6. The method of claim 1, wherein determining an efficiency for the identified content item configuration includes removing a contribution in an efficiency calculation for a respective eligible content item that is associated with a given position of the block.

7. The method of claim 1, wherein the eligible content items are advertisements.

8. The method of claim 1 wherein dynamically re-sizing the eligible content items that are selected for presentation in the identified content item configuration is based at least in part on a value to a respective sponsor for inclusion of their content item in the block.

9. The method of claim 1 further comprising determining a reserve price that is associated with the block for any content items that are to be included in the block and using the reserve price in establishing the price.

10. The method of claim 9, wherein establishing the price includes using the reserve price as a floor when calculating the efficiency for the identified content item configuration.

11. The method of claim 10, wherein using the reserve price as a floor includes using the reserve price instead of a bid price when the bid price is less than the reserve price for a given eligible content item.

12. The method of claim 1, wherein establishing a price further includes dividing the efficiency for the identified content item configuration by a quality score of a respective eligible content item that is selected for presentation in a given position.

13. The method of claim 12, wherein the quality score includes a measure of predicted performance for a given eligible content item when presented in a position in the block.

14. A system comprising:
  one or more computing devices; and
  one or more computer-readable media coupled to the one or more computing devices and having instructions stored thereon which, when executed by the one or more computing devices, cause the one or more computing devices to perform operations comprising:
    receiving a request for content to fill a block, the request including information about a size of the block and selection criteria for identifying one or more eligible content items for inclusion in the block;
    determining estimated conversion rates of content items presented in different content item configurations, each with different amounts of dynamic content item resizing applied to one or more of the content items in the different content item configurations, wherein a content item conversion is a specified user action that is completed at a website to which a user is directed after and in response to the user interacting with the content item;
    determining an efficiency for each of the different content item configurations with the different amounts of dynamic content item resizing applied, wherein the efficiency for a given content item configuration with k content items included in the block is determined as:

$$c_k \Sigma_{j=1}^{k} x_{j,k} v_{(j)},$$

where $c_k$ is an estimated conversion rate of content items presented in the given content item configuration when k content items are presented in the given content item configuration, $x_{j,k}$ is a position effect for a content item shown in a j-th position in the given content item configuration when k content items are presented in the given content item configuration, and $v_{(j)}$ is a j-th highest effective bid from a set of multiple effective bids from content item sponsors for inclusion of their respective content items in the block;

determining how many content items to be included in the block, including:
identifying a content item configuration having a highest efficiency; and
determining a number of content items that are included in the identified content item configuration having the highest efficiency;

selecting the number of eligible content items for presentation in the identified content item configuration;

dynamically re-sizing eligible content items selected for presentation in the identified content item configuration according to the dynamic content item resizing that was applied when the efficiency for the identified content item configuration was determined;

establishing a price to be charged to each content item sponsor having an eligible content item that was selected for presentation in the identified content item configuration; and providing the selected eligible content items responsive to the request and charging the content item sponsors based on the established prices.

15. The system of claim 14 wherein an effective bid price is based on a combination of a bid price and a quality score for a respective individual eligible content item when included in the block.

16. The system of claim 14 wherein establishing includes, for each position in the identified content item configuration:
determining a total increase in efficiency for all other content items when removing a content item selected for presentation in a given position, wherein the total increase in efficiency is based on all content items except the removed content item; and
establishing a price for each position based on the determined increase in efficiency.

17. The system of claim 16 wherein determining a total increase in efficiency further includes:
determining an efficiency for the identified content item configuration without a respective content item that is selected for presentation in a given position;
determining a total counterfactual efficiency equal to the highest efficiency content item configuration that does not include a respective eligible content item in the block; and
combining the determined efficiency and the determined total counterfactual efficiency.

18. A non-transitory computer storage medium encoded with a computer program, the program comprising instructions that when executed by data processing apparatus cause the data processing apparatus to perform operations comprising:
receiving a request for content to fill a block, the request including information about a size of the block and selection criteria for identifying one or more eligible content items for inclusion in the block;

determining estimated conversion rates of content items presented in different content item configurations, each with different amounts of dynamic content item resizing applied to one or more of the content items in the different content item configurations, wherein a content item conversion is a specified user action that is completed at a website to which a user is directed after and in response to the user interacting with the content item;

determining an efficiency for each of the different content item configurations with the different amounts of dynamic content item resizing applied, wherein the efficiency for a given content item configuration with k content items included in the block is determined as:

$$c_k \Sigma_{j=1}^{k} x_{j,k} v_{(j)},$$

where $c_k$ is an estimated conversion rate of content items presented in the given content item configuration when k content items are presented in the given content item configuration, $x_{j,k}$ is a position effect for a content item shown in a j-th position in the given content item configuration when k content items are presented in the given content item configuration, and $v_{(j)}$ is a j-th highest effective bid from a set of multiple effective bids from content item sponsors for inclusion of their respective content items in the block;

determining how many of content items to be included in the block, including:
identifying a content item configuration having a highest efficiency; and
determining a number of content items that are included in the identified content item configuration having the highest efficiency;

selecting the number of eligible content items for presentation in the identified content item configuration;

dynamically re-sizing eligible content items selected for presentation in the identified content item configuration according to the dynamic content item resizing that was applied when the efficiency for the identified content item configuration was determined;

establishing a price to be charged to each content item sponsor having an eligible content item that was selected for presentation in the identified content item configuration; and providing the selected eligible content items for presentation in the identified content item configuration responsive to the request and charging the content item sponsors based on the established prices.

19. The non-transitory computer storage medium of claim 18 wherein an effective bid is based on a combination of a bid price and a quality score associated with a respective individual eligible content item when included in the block.

20. The non-transitory computer storage medium of claim 18 wherein establishing includes, for each position in the identified content item configuration:
determining a total increase in efficiency for all other content items when removing a content item selected for presentation in a given position, wherein the total increase in efficiency is based on all content items except the removed content item; and establishing a price for each position based on the determined increase in efficiency.

* * * * *

UNITED STATES PATENT AND TRADEMARK OFFICE
CERTIFICATE OF CORRECTION

| | |
|---|---|
| PATENT NO. | : 10,269,045 B2 |
| APPLICATION NO. | : 14/312425 |
| DATED | : April 23, 2019 |
| INVENTOR(S) | : Hummel |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this
Nineteenth Day of May, 2020

Andrei Iancu
*Director of the United States Patent and Trademark Office*